(12) United States Patent
Song et al.

(10) Patent No.: US 8,676,269 B2
(45) Date of Patent: Mar. 18, 2014

(54) MOBILE TERMINAL HAVING WIDE DISPLAY UNIT

(75) Inventors: Han Gil Song, Seoul (KR); Sang Min Hyun, Seoul (KR); Seog Guen Kim, Seoul (KR); Jun Sang Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 12/694,731

(22) Filed: Jan. 27, 2010

(65) Prior Publication Data

US 2010/0197356 A1 Aug. 5, 2010

(30) Foreign Application Priority Data

Jan. 30, 2009 (KR) .................. 10-2009-0007318

(51) Int. Cl.
*H04B 1/38* (2006.01)
*H04M 1/00* (2006.01)
*G09G 5/00* (2006.01)

(52) U.S. Cl.
USPC .................. 455/566; 455/575.3; 455/575.4; 455/575.1; 455/550.1; 345/1.1; D14/138 AB; D14/138 AD; D14/138 G

(58) Field of Classification Search
USPC ............... 455/566, 575.3, 575.4, 575.1, 90.3, 455/550.1; 345/1.1, 2.3, 168; D14/138, D14/138 AB, 138 AD, 138 G
See application file for complete search history.

(56) References Cited

U.S. PATENT DOCUMENTS 5,644,338 A * 7/1997 Bowen .......................... 345/168
2007/0085759 A1* 4/2007 Lee et al. ....................... 345/1.1

* cited by examiner

*Primary Examiner* — Opiribo Georgewill
(74) *Attorney, Agent, or Firm* — H.C. Park & Associates, PLC

(57) ABSTRACT

A mobile terminal having a wide display unit is provided. The mobile terminal includes a main body having a first display unit therein. The mobile terminal includes a folder unit having a second display unit at an inner surface opposite to the first display unit. The terminal also includes a sliding unit connected to one end of the folder unit to guide the folder unit capable of performing a slide movement. The terminal includes a hinge coupler to connect the sliding unit and the main body such that the sliding unit rotates based on the main body. The folder unit positions the second display unit to be adjacent to the first display unit by performing a slide movement toward the main body when the folder unit is opened as the sliding unit rotates based on the hinge coupler, and a wide display unit is formed when a surface of the first display unit and a surface of the second display unit become in a single plane. Thereby, mobility of a mobile terminal while providing a wide display unit can be provided.

12 Claims, 11 Drawing Sheets

MOBILE TERMINAL HAVING WIDE DISPLAY UNIT

CROSS REFERENCE TO RELATED APPLICATION

This application claims priority from and the benefit of the Korean Application No. 10-2009-0007318, filed on Jan. 30, 2009, which is hereby incorporated by reference for all purposes as if fully set forth herein.

BACKGROUND OF THE INVENTION

1. Field of the Invention

Exemplary embodiments of the present invention relates to a mobile terminal, and more particularly, to a mobile terminal capable of extending a display unit.

2. Description of the Background

A mobile terminal is an electronic device which provides users with convenience of mobility along with rich set of services such as wireless communication, network connection, and digital broadcasting reception regardless of time and location. This convenience spawned various mobile terminals to develop effectively performing a communication function, Internet connection function, and digital broadcasting reception function. Further, a function such as document writing and a game player can be added to the mobile terminal.

To promote greater adoption, manufacturers of a mobile terminal effort to develop a gradually increasing size of display unit capable of showing the rich set of services of a mobile terminal to enable a user to conveniently perform such functions.

However, a typical display unit of a mobile terminal has a limited display area, thus rendering a visual limitation in order to use a function such as Internet web browsing. However, an approach to overcome such a limitation by increasing a size of the display unit bears a problem such as deteriorating mobility of the mobile terminal.

Therefore, there is a need for an approach for providing a mobile terminal for satisfying both mobility of the mobile terminal and multi-performance requirements using a wide display area without increasing the display unit.

SUMMARY OF THE INVENTION

These and other needs are addressed by the present invention, in which exemplary embodiments of the present invention provide a mobile terminal that supports a mobility of the mobile terminal as well as capable of providing a wide display unit by positioning a first display unit of a main body adjacent to a second display unit of a folder unit according to a user settings.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a mobile terminal that supports a mobility as well as capable of providing a wide display unit by positioning a first display unit of a main body adjacent to a second display unit of a folder unit according to a user settings. The mobile terminal includes a main body having a first display unit. The mobile terminal includes a folder unit having a second display unit provided opposite to the first display unit. The mobile terminal also includes a sliding unit connected to one end of the folder unit to guide slide movement of the folder unit. The mobile terminal includes a hinge coupler to connect the sliding unit and the main body such that the sliding unit rotates based on the main body. The second display unit locates adjacent to the first display unit according to the slide movement of the folder unit toward the main body, the folder unit being opened by the sliding unit rotation based on the hinge coupler. And a wide display unit is formed based on a surface of the first display unit and a surface of the second display unit formed in a single plane.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

An apparatus, method and software for control of a mobile terminal having wide display unit are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although exemplary embodiments of the present are discussed with respect to a mobile communication terminal, it is recognized by one of ordinary skill in the art that the embodiments of the present invention have applicability to any type of communication system, for example, an information and communication device or a multimedia device such as a mobile communication terminal, a mobile phone, a personal digital assistant (PDA), a smart phone, an International Mobile Telecommunication 2000 (IMT-2000) terminal, a code division multiple access (CDMA) terminal, a wideband code division multiple access (WCDMA) terminal, a Global System for Mobile communication (GSM) terminal, a general packet radio service (GPRS) terminal, an enhanced data GSM environment (EDGE) terminal, a universal mobile telecommunication service (UMTS) terminal, a digital broadcasting terminal.

Figure 1A:
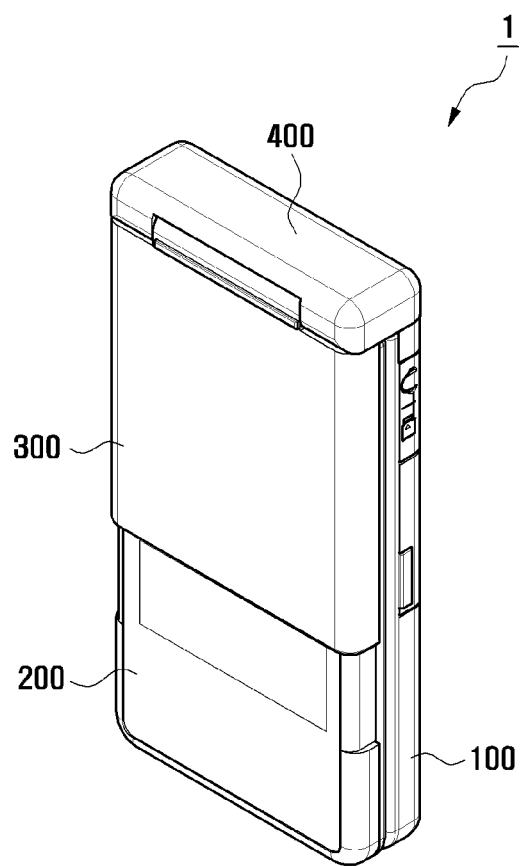
FIG. 1A and FIG. 1B are exemplary perspective views illustrating a mobile terminal, according to exemplary embodiments of the present invention.
Figure 1B:
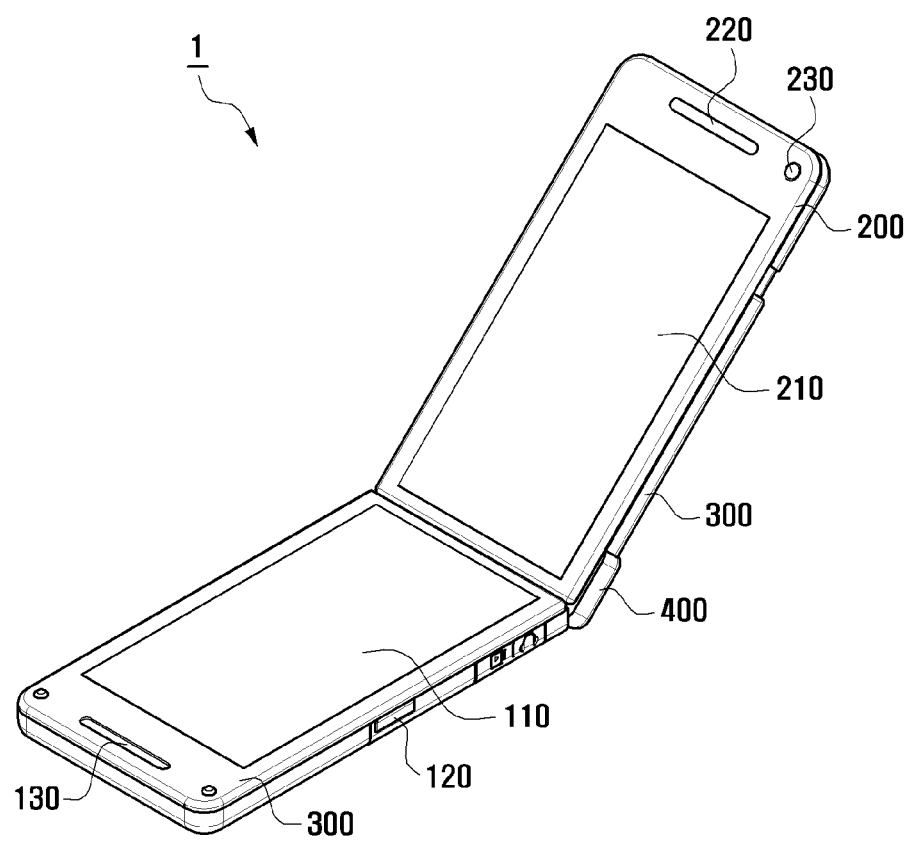

FIG. 1A and FIG. 1B are exemplary perspective views illustrating a mobile terminal, according to an exemplary embodiment of the present invention.

Referring to FIG. 1A, a mobile terminal 1 may include a main body 100, a folder unit 200, a sliding unit 300, and a hinge coupler 400. The mobile terminal 1, for example, may be a folder type mobile terminal. The mobile terminal 1 may be one of various types of portable electronic devices such as a mobile phone, a PDA, a portable multimedia player (PMP), a navigation device, and a digital broadcasting receiver.

Referring to FIG. 1B, the main body 100 may have a first display unit 110 therein, and as the sliding unit 300 rotates, while the folder unit 200 being opened, the first display unit 110 can be exposed to an outside.

The first display unit 110 may perform a function of a user interface to output a desired screen to a user and to receive an instruction from a user. The first display unit 110 may utilize a liquid crystal display (LCD) or an organic light emitting diodes (OLED). The LCD is an electric device for changing various electrical information generated in various devices to visible information and delivering the visible information using a change of a transmittance of liquid crystal according to an applied voltage. Further, the OLED is a light emission organic material for emitting light using field emission phenomenon of emitting light when a current flows to a fluorescent organic compound. The first display unit 110 may utilize a thin film transistor (TFT), an electrophoretic, and a laser induced thermal image (LITI) technology. It is contemplated that the first display unit 110 may have a touch screen function.

The main body 100 may have a key input unit to receive an instruction from a user. The key input unit can be installed at a front surface or a side surface of the main body 100 associated with a keypad or a key button. FIG. 1B illustrates an example of a key input unit 120 of a key button form that can be installed at a side surface of the main body 100. In some examples, a microphone 130 may be configured to input sound information that can be installed at a lower end portion of the main body 100, and an antenna (not shown) is provided to transmit and to receive a wireless signal that can be installed at an upper end portion or a lower end portion of the main body 100.

The folder unit 200 may have a second display unit 210 in an inner surface opposite to the first display unit 110. As the sliding unit 300 rotates, while the folder unit 200 being opened, the second display unit 210 can be exposed to the outside. As in the first display unit 110, the second display unit 210 can use an LCD or an OLED and may have a touch screen function. In an upper end portion of the folder unit 200, a speaker 220 can be provided to hear voice or sound information and a camera 230 can be configured to photograph or to perform audiovisual communication.

Although not shown, a first electronic circuit board can be mounted at the inside of the main body 100, and a second electronic circuit board can be mounted at the inside of the folder unit 200. The first electronic circuit board and the second electronic circuit board may have a thin plate shape and may include various electronic parts and wirings to connect the electronic parts. In some examples, the first electronic circuit board and the second electronic circuit board may use a printed circuit board (PCB).

The first display unit 110 can be provided in the main body 100 and the second display unit 210 can be provided in the folder unit 200 to receive an electrical signal from the first electronic circuit board and the second electronic circuit board, respectively, to output various information of the mobile terminal 1 or to receive an instruction from a user. In order to transmit an electrical signal to each of the first electronic circuit board and the second electronic circuit board formed in a connection, the first electronic circuit board and the first display unit 110, and the second electronic circuit board and the second display unit 210, a flexible printed circuit board (FPCB) (not shown) can be used. For example, the FPCB is a flexible printed circuit in which a minute circuit can be printed on a thin plate film of a flexible plastic material. In order to couple the FPCB to the first electronic circuit board and the second electronic circuit board, a connector (not shown) can be used at a portion of the FPCB.

The sliding unit 300 can be connected to one end of the folder unit 200, and the folder unit 200 can guide to perform a sliding movement. As the sliding unit 300 rotates based on the hinge coupler 400, while the folder unit 200 being opened, the folder unit 200 can perform a sliding movement toward the main body 100 and positions the second display unit 210 to be adjacent to the first display unit 110, and when a surface of the first display unit 110 and a surface of the second display unit 210 become one plane, a wide display unit can be formed.

Figure 2A:
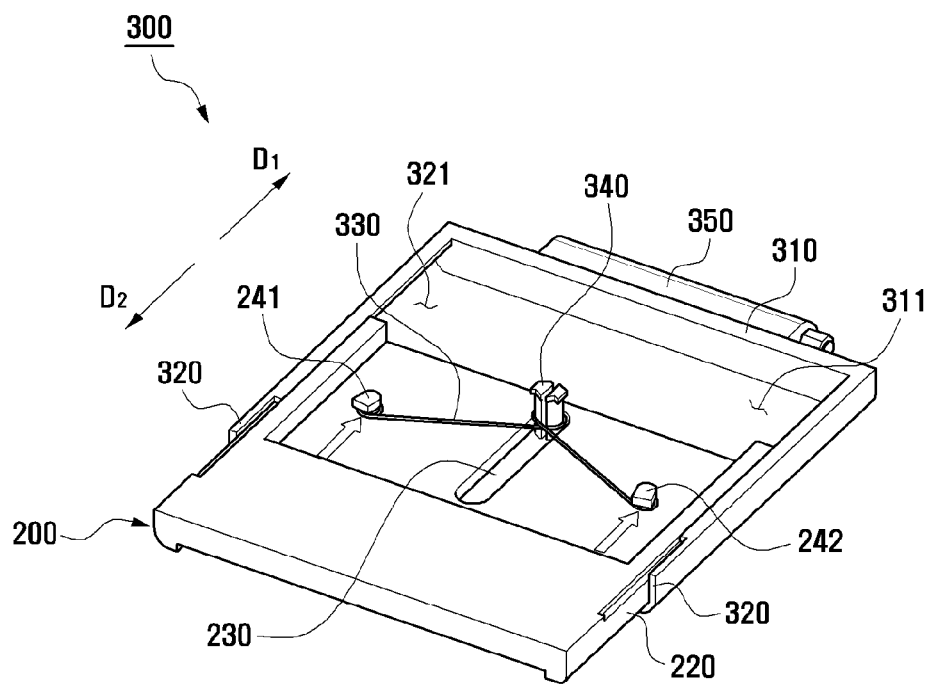
FIG. 2A and FIG. 2B are exemplary perspective views illustrating a configuration of a sliding unit of the mobile terminal of FIG. 1A and FIG. 1B.
Figure 2B:
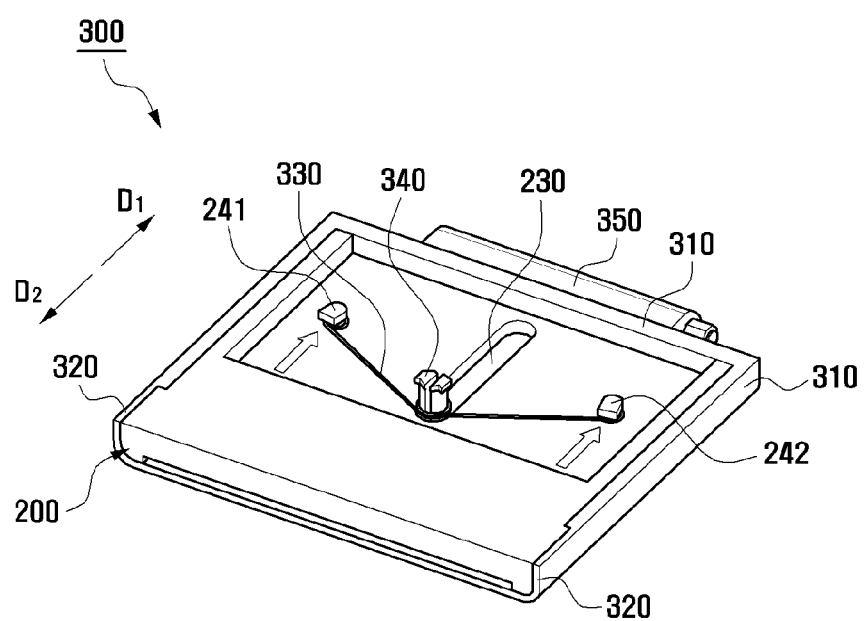

FIGS. 2A and 2B are exemplary perspective views illustrating a configuration of a sliding unit of the mobile terminal of FIG. 1A and FIG. 1B.

Referring to FIG. 2A and FIG. 2B, the sliding unit 300 can include a body 310, a guide unit 320, an elastic member 330, and a stop portion 340. In FIG. 2A, when the folder unit 200 is in a closed state, a position of the folder unit 200 within the sliding unit 300 can be displayed, and in FIG. 2B, as the sliding unit 300 rotates, while the folder unit 200 being in a open state, a position of the folder unit 200 within the sliding unit 300 can be displayed.

A space 311 for housing one end of the folder unit 200 can be formed at the inside of the body 310. Therefore, a thickness of the body 310 can be formed almost equal to or slightly greater than that of the folder unit 200. As shown in FIG. 2A, as an upper surface of the body 310 is opened, a section shape thereof can have substantially '⊏' shape and one side is opened so that the folder unit 200 can move in a length direction of the body 310, and a hinge portion 350 can rotatably be connected to the second hinge portion 420 of the hinge coupler 400 in a closed state that can be formed at the other side.

The guide unit 320 can be formed at one side or both sides of the body 310 and may perform a function of guiding a sliding movement of the folder unit 200. FIG. 2A and FIG. 2B can illustrate an example in which a guide groove 321 can be formed long in a length direction of the body 310. In this example, at both side surfaces of the folder unit 200, a projection 220 having a shape corresponding to the guide groove 321 can be inserted into the guide groove 321. A structure of the guide unit 320 shown in FIG. 2A and FIG. 2B is an exemplary view in which the guide unit 320 may have a structure to guide a sliding movement of the folder unit 200 within the sliding unit 300, and an installation position thereof can be recognized by one of ordinary skill in the art. As an example, the guide unit 320 may be formed between the sliding unit 300 and the folder unit 200 and may insert a part such as an LM Guide.

The elastic member 330 may connect the folder unit 200 and the body 310, and when the folder unit 200 performs a sliding movement, the elastic member 330 can provide an elastic force to the folder unit 200. In FIG. 2A and FIG. 2B, a central portion of the elastic member 330 can be fixed to the stop portion 340 of the sliding unit 300, and FIG. 2A and FIG. 2B can illustrate a form of a coil spring connected to fixed projections 241 and 242 in which both ends can be formed in the folder unit 200. For example, the folder unit 200 can receive an elastic force in a direction (first direction) D1 inserted into the inside of the sliding unit 300 by a coil spring. When the folder unit 200 is closed, the folder unit 200 can perform a sliding movement in a direction (second direction) D2 opposite to a direction inserted into the inside of the sliding unit 300 by interference with the hinge coupler 400 and can perform a sliding movement in a direction (first direction) D1 inserted into the inside of the sliding unit 300 by a coil spring when the folder unit 200 is opened according to the sliding unit 300 rotates.

It is understood that the coil spring shown in FIG. 2A and FIG. 2B is an illustration, and a various similar types of connection structures of the elastic member 330 may be utilized. As an example, one end of the elastic member 330 may be fixed to the sliding unit 300, and the other end thereof may use a compression spring or a tension spring fixed to the folder unit 200.

The stop portion 340 may limit a sliding movement of the folder unit 200 so that the second display unit 210 can be positioned at a desired position. In FIG. 2A and FIG. 2B, the stop portion 340 having a cylindrical shape can be formed in the sliding unit 300, and a long groove 230 of a slot form can be formed in the folder unit 200, and thus a sliding movement of the folder unit 200 can be limited. The stop portion 340 shown in FIG. 2A and FIG. 2B is an illustration, and a shape, an installation position, and the quantity of the stop portion 340 can be recognized by one of ordinary skill in the art. Further, the stop portion 340 may be included in the guide unit 320.

Referring again to FIG. 1A and FIG. 1B, the hinge coupler 400 may connect the sliding unit 300 and the main body 100 so that the sliding unit 300 may rotate based on the main body 100.

Figure 3A:
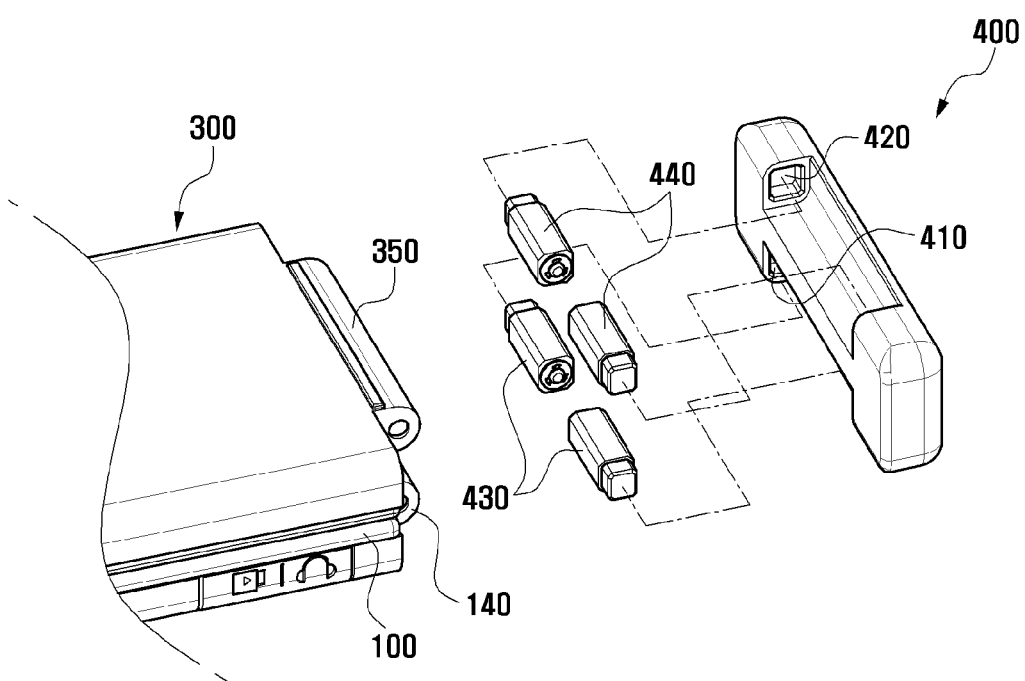
FIG. 3A is an exemplary perspective view illustrating a configuration of a hinge coupling unit of the mobile terminal of FIG. 1A and FIG. 1B.

FIG. 3A is an exemplary perspective view illustrating a configuration of a hinge coupling unit of the mobile terminal of the mobile terminal of FIG. 1A and FIG. 1B.

Figure 3B:
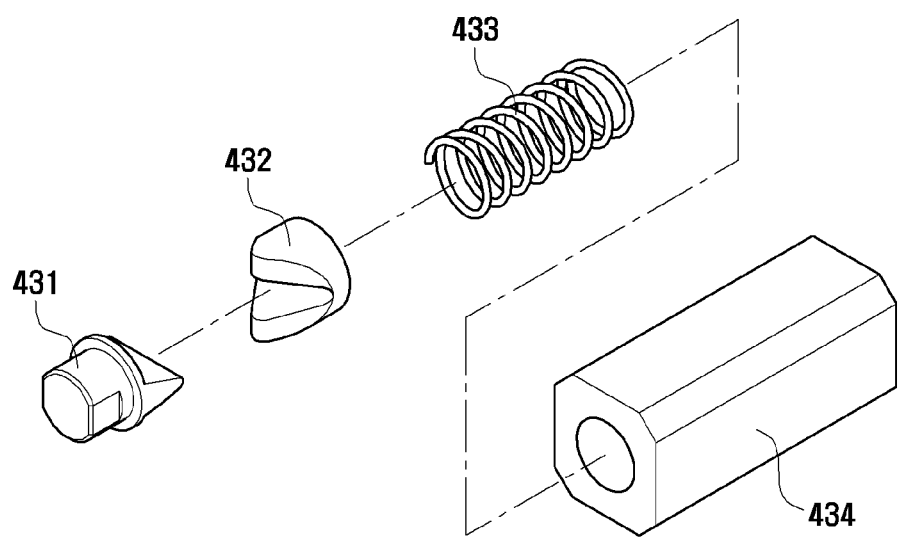
FIG. 3B is an exemplary perspective view illustrating a first folder hinge and a second folder hinge in a hinge coupling unit of the mobile terminal of FIG. 1A and FIG. 1B.

Referring to FIG. 3A, the hinge coupler 400 may include a first hinge portion 410 rotatably connected to one side of the main body 100 and a second hinge portion 420 rotatably connected to one side of the sliding unit 300. Further, a first folder hinge 430 can be connected to the first hinge portion 410, and a second folder hinge 440 can be connected to the second hinge portion 420. In FIG. 3A and FIG. 3B, the first hinge portion 410 and the second hinge portion 420 may have an insertion hole form, and the first folder hinge 430 and the second folder hinge 440 may have a shaft form. The first folder hinge 430 can be inserted into the hinge portion 140 formed in an upper end portion of the main body 100, and the second folder hinge 440 can be inserted into the hinge portion 350 formed in an upper end portion of the sliding unit 300. As shown in FIG. 3A, the hinge portion 140 formed in an upper end portion of the main body 100 and the hinge portion 350 formed in an upper end portion of the sliding unit 300 may have a form of a hinge hole to insert and to couple the first folder hinge 430 and the second folder hinge 440, respectively.

The first folder hinge 430 may provide resisting power when the sliding unit 300 rotates about the first hinge portion 410, and the second folder hinge 440 may provide resisting power (e.g., resilient friction power) when the sliding unit 300 rotates about the second hinge portion 420. For example, the first folder hinge 430 and the second folder hinge 440 can use an elastic force as resisting power to provide to the first hinge portion 410 and the second hinge portion 420.

FIG. 3B is an exemplary perspective view illustrating a first folder hinge and a second folder hinge connected to a hinge coupling unit of the mobile terminal of FIG. 1A and FIG. 1B.

Structures of the first folder hinge 430 and the second folder hinge 440 may substantially identical, and FIG. 3B illustrates the first folder hinge 430.

Referring to FIG. 3B, the first folder hinge 430 may include a hinge shaft 431, hinge cam 432, hinge spring 433, and hinge housing 434. The hinge shaft 431 and the hinge cam 432 may have a substantially cylindrical shape and can be coupled in a rotation axis direction. When the sliding unit 300 rotates, in order for the hinge cam 432 to rotate semi-automatically or manually, the hinge cam 432 may have a cam shape in a coupling surface with the hinge shaft 431. When the sliding unit 300 rotates in a cam shape formed in the hinge cam 432, a fixed position of the sliding unit 300 may be determined. The hinge spring 433 is connected to the hinge cam 432 to provide a compressive force or a tensile force when the hinge cam 432 rotates about the hinge shaft 431. A penetration hole of the hinge shaft 431 can be formed at one side surface of the hinge housing 434, and a hinge projection (not shown) can be formed at the other side surface thereof. Therefore, the hinge shaft 431 can be coupled to the first hinge portion 410 of the hinge coupler 400, and a hinge projection can be coupled to a hinge portion formed in an upper end portion of the folder unit 200.

As described above, as the hinge spring 433 of the first folder hinge 430 and the second folder hinge 440 can provide a compressive force or a tensile force, the hinge spring 433 can provide resisting power to the first hinge portion 410 and the second hinge portion 420. A magnitude of resisting power (compressive force or tensile force) provided by the first folder hinge 430 and the second folder hinge 440 may be adjusted by the coil rotation quantity of the hinge spring 433.

In some examples, resisting power provided by the first folder hinge 430 can be formed greater than the resisting power provided by the second folder hinge 440. That is, the coil rotation quantity of the hinge spring 433 of the first folder hinge 430 is greater than the coil rotation quantity of the hinge spring 433 of the second folder hinge 440. Therefore, when the sliding unit 300 starts to rotate, the sliding unit 300 first rotates about the second hinge portion 420 and rotates about the first hinge portion 410.

A structure of the first folder hinge 430 and the second folder hinge 440 shown in FIG. 3B is an illustration and can be recognized by one of ordinary skill in the art.

In the mobile terminal 1 according to the exemplary embodiments, a rotation angle of the sliding unit 300 can be determined according to user settings. For example, in a using condition such as communication and character message transmission, the sliding unit 300 can rotate by about '145°' and when viewing a moving picture or in a performing Internet web browsing, in order to form a wide display, the sliding unit 300 can rotate by '180°.'

In this way, in order to determine a rotation angle of the sliding unit 300 according to a user's use, the first hinge portion 410 and the second hinge portion 420 can limit a rotation of the sliding unit 300 so that the sliding unit 300 may stop rotating at a predetermined position. In some examples, the first hinge portion 410 can limit the sliding unit 300 to rotate by about '45°' and '90°,' and the second hinge portion 420 can limit the sliding unit 300 to rotate by '90°.' Therefore, the sliding unit 300 first rotates based on the second hinge portion 420 by '90°' and rotates based on the first hinge portion 410 by about '45°' or '90°.' When the sliding unit 300 finally rotates by '180°,' it is contemplated that surfaces of the first display unit 110 and the second display unit 210 can become in a single plane. In order to limit a rotation of the sliding unit 300 such that the sliding unit 300 may stop rotating at a predetermined position, a stop portion (not shown) can be formed at an appropriate portion of the first hinge portion 410 and the second hinge portion 420, or a cam shape formed in a hinge cam of the first folder hinge 430 and the second folder hinge 440 can be appropriately designed.

When the sliding unit 300 rotates about the second hinge portion 420, the folder unit 200 may perform a sliding movement. That is, when the sliding unit 300 rotates by '90°,' the folder unit 200 may not be interfered by the hinge coupler 400 and can perform a sliding movement in an insertion direction (first direction) D1 into the inside of the sliding unit 300, and when the sliding unit 300 rotates again to '0°,' the folder unit 200 can perform a sliding movement in a direction D2 (second direction) opposite to an insertion direction into the inside of the sliding unit 300 by interference with the hinge coupler 400. This is described in detail with reference to FIG. 4A, FIG. 4B, FIG. 4C and FIG. 5A FIG. 5B and FIG. 5C.

A rotation angle of the sliding unit 300 can be described in detail with a value of '0°,' '90°,' '145°,' and '180°,' however the rotation angle can be illustrated for convenience of description and a rotation angle of the sliding unit 300 cannot be limited thereto and can be recognized by one of ordinary skill in the art.

FIG. 1A, FIG. 1B, FIG. 2A, FIG. 2B, FIG. 3A, and FIG. 3B are exemplary views illustrating a mobile terminal in which the folder unit 200 can perform a sliding movement in a length direction of the main body 100 within the sliding unit 300, and in which the hinge coupler 400 can be formed at one end of a width direction of the main body 100, i.e.,—at an upper end portion of the main body 100. However, in some examples, the folder unit 200 may perform a sliding movement in a width direction of the main body 100 within the sliding unit 300, and the hinge coupler 400 may be formed at one end of a length direction of the main body 100, i.e.,—at a one side portion of the main body 100.

In some examples, a first electronic circuit board and a second electronic circuit board may be installed at the inside of the main body 100 or the folder unit 200, and the first electronic circuit board and the second electronic circuit may be embodied through various software modules for controlling an operation and function of the mobile terminal 1.

Such a software module may include a display controller (not shown) for controlling a screen output of the first display unit 110 and the second display unit 210. The display controller can control a screen output of the first display unit 110 and the second display unit 210 according to a position of the second display unit 210 due to a rotation of the sliding unit 300.

For example, until the sliding unit 300 rotates by about '145°' after starting to rotate, the display controller can control the first display unit 110 to output a touch keypad including numerals, characters, and special symbols and can control the second display unit 210 to output various information. Further, when the sliding unit 300 rotates by '180°' and the first display unit 110 and the second display unit 210 form a wide display unit, the display controller can control to extend an output screen to a full screen of a wide display unit. A sensor (not shown) may be provided to detect a rotation position of the sliding unit 300 that can be installed at the main body 100, the folder unit 200 or the sliding unit 300.

Figure 4A:
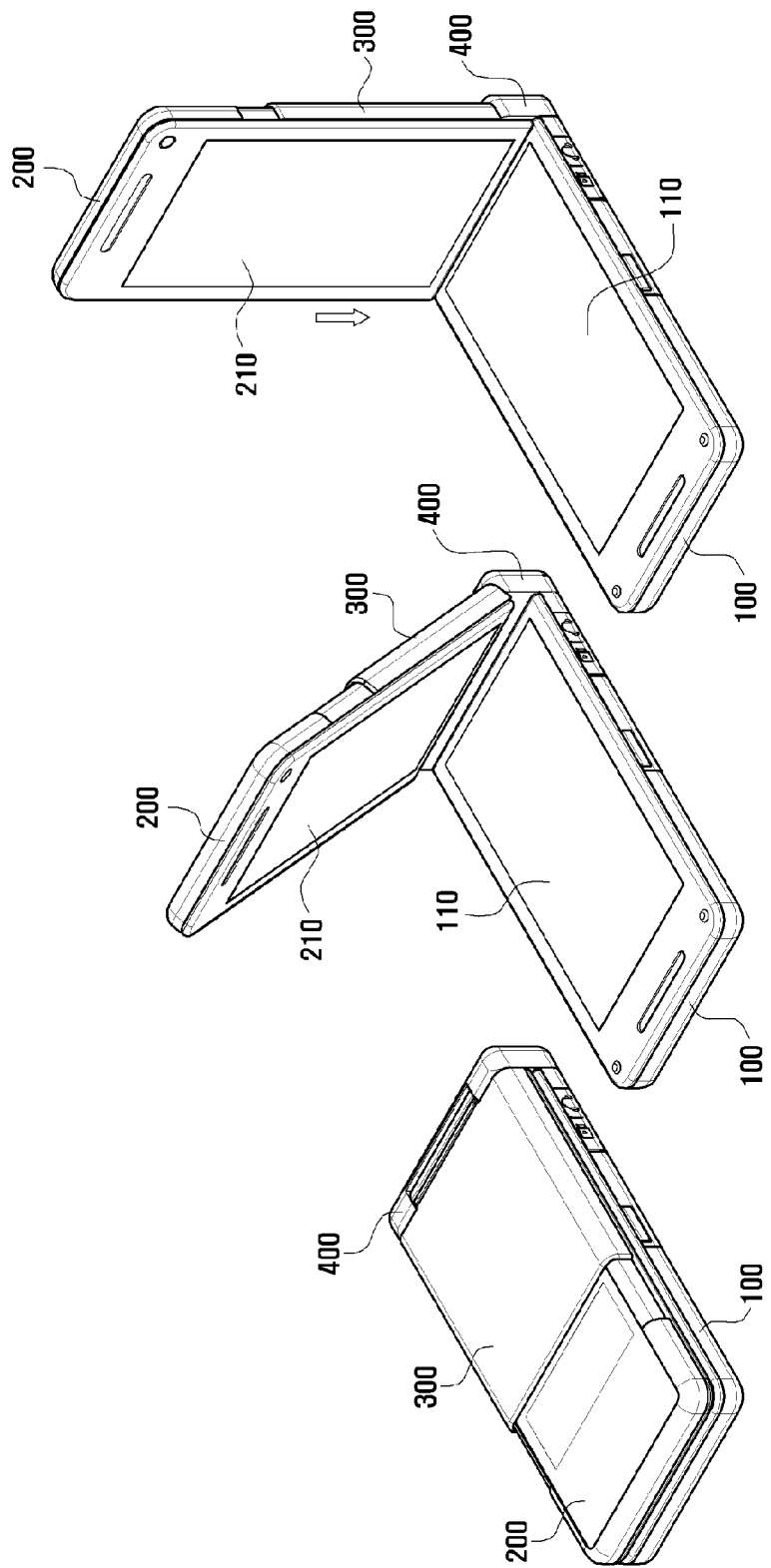
FIG. 4A, FIG. 4B and FIG. 4C are exemplary views illustrating a sliding unit of the mobile terminal of FIG. 1A and FIG. 1B rotates by '90,' according to exemplary embodiments of the present invention.
Figure 4B:
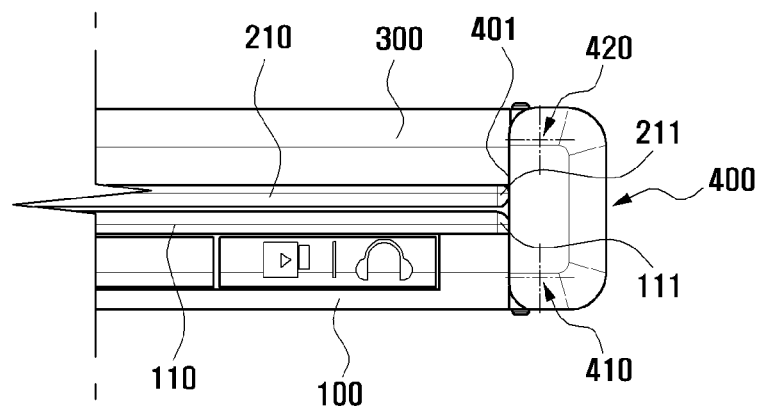
Figure 4C:
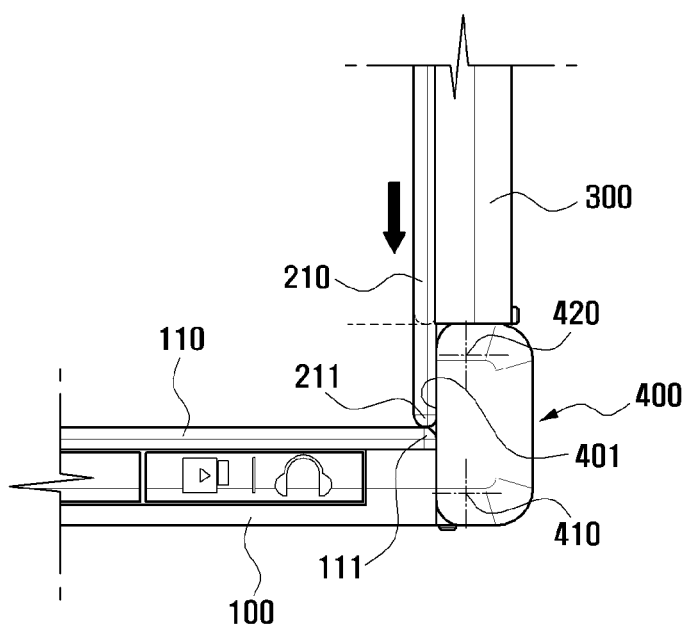

FIG. 4A, FIG. 4B and FIG. 4C are exemplary views illustrating a sliding unit 300 of the mobile terminal of FIG. 1A and FIG. 1B rotates by '90°,' according to exemplary embodiments of the present invention.

FIG. 4A sequentially illustrates a state when the sliding unit 300 rotates by '90°,' FIG. 4B illustrates a state where the sliding unit 300 is folded, and FIG. 4C illustrates a state where the sliding unit 300 rotates by '90°.'

Referring to FIG. 4B, in a state where the folder unit 200 is closed, one end 211 of the second display unit 210 of the folder unit 200 can contact with a lower surface 401 of the hinge coupler 400. In this example, the folder unit 200 is in a sliding movement state in a direction (second direction) D2 opposite to an insertion direction into the inside of the sliding unit 300, as shown in FIG. 2A.

As described above, because resisting power, in which the first folder hinge 430 can provide to the first hinge portion 410, is greater than resisting power in which the second folder hinge 440 can provide to the second hinge portion 420, when the sliding unit 300 starts to rotate, the sliding unit 300 can rotate about the second hinge portion 420. When the sliding unit 300 rotates about the second hinge portion 420, one end 211 of the second display unit 210 can be separated from the lower surface 401 of the hinge coupler 400. Therefore, as shown in FIG. 2B, the folder unit 200 can receive a force from the elastic member 330 of the sliding unit 300 to perform a sliding movement in an insertion direction (first direction) D1 into the inside of the sliding unit 300.

Referring to FIG. 4C, in a state where the sliding unit 300 rotates by '90°,' the second display unit 210 can be positioned in parallel to the lower surface 401 of the hinge coupler 400, and one end 211 of the second display unit 210 is in a contact state with one end 111 of the first display unit 110.

Figure 5A:
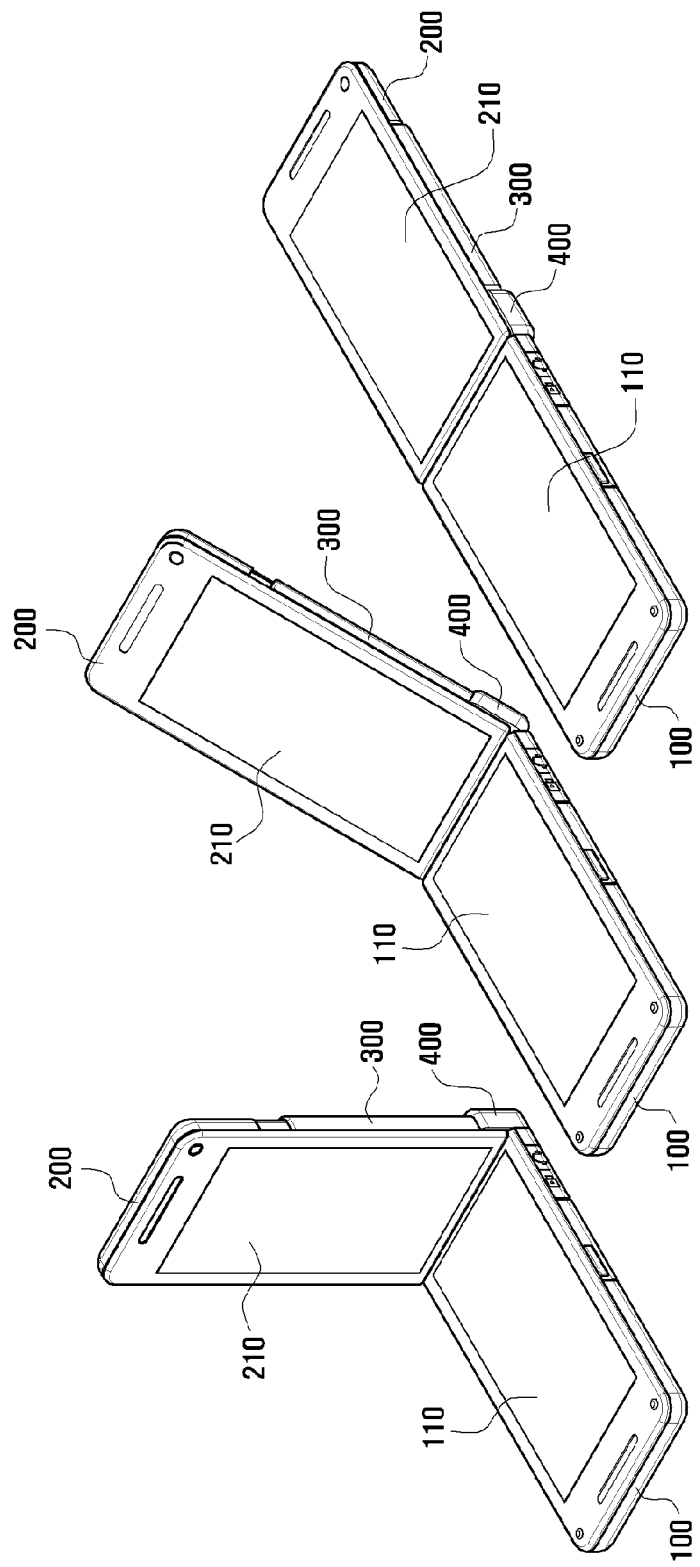
FIG. 5A, FIG. 5B and FIG. 5C are exemplary views illustrating a sliding unit of the mobile terminal rotates by '180°,' according to exemplary embodiments of the present invention.
Figure 5B:
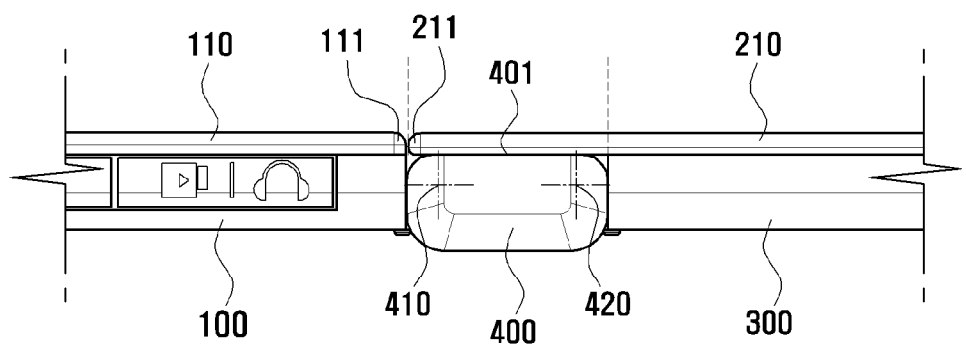
Figure 5C:
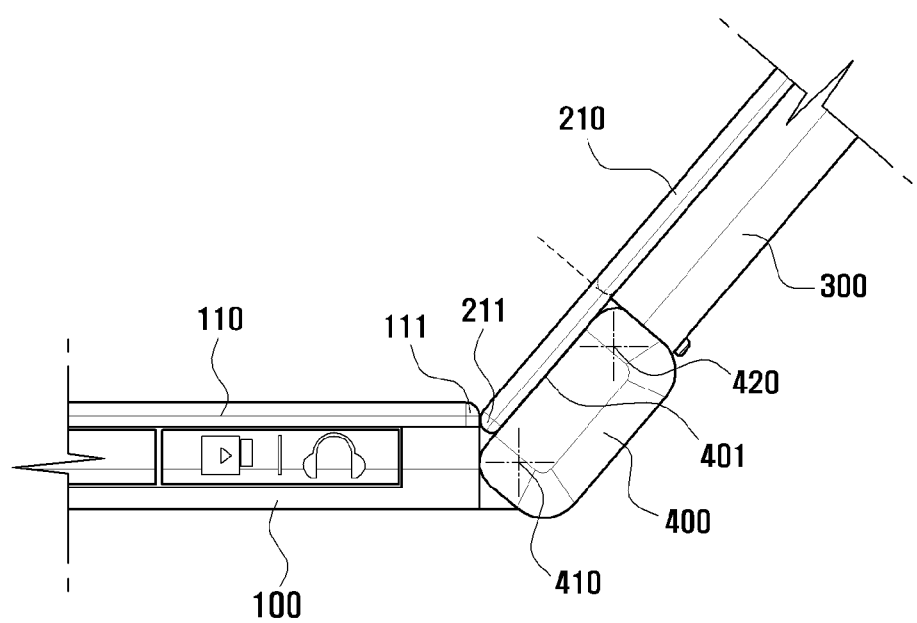
Figure 6A:
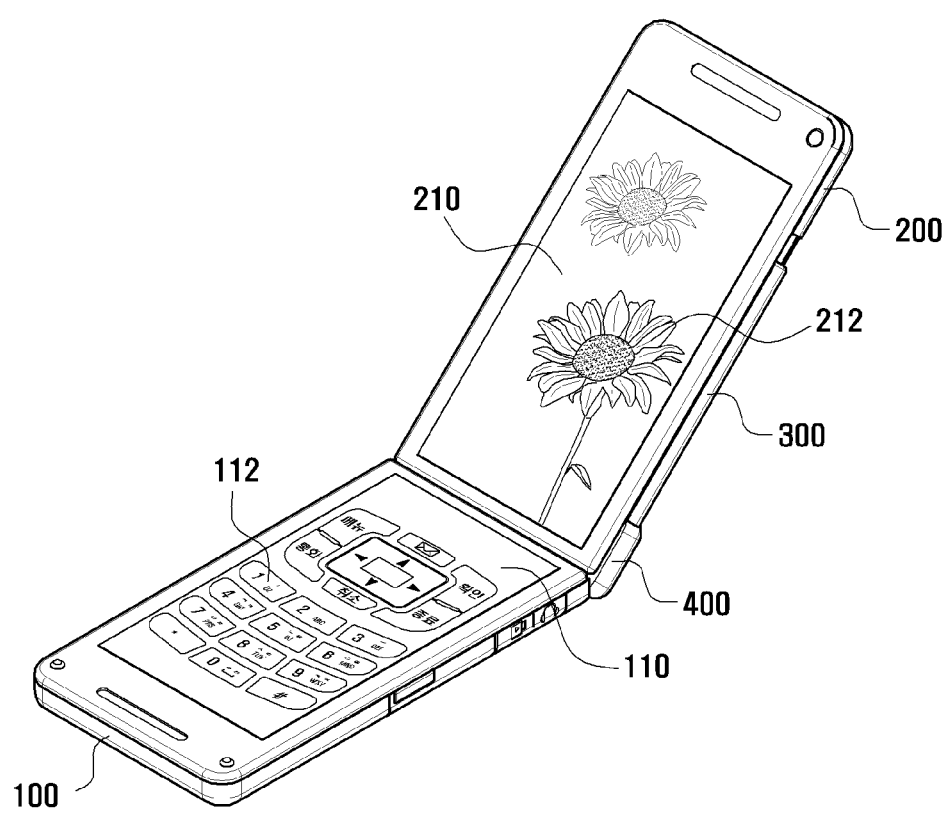
FIG. 6A and FIG. 6B illustrate exemplary screen output of a first display unit and a second display unit according to a user setting of the mobile terminal of FIG. 1A and FIG. 1B.
Figure 6B:
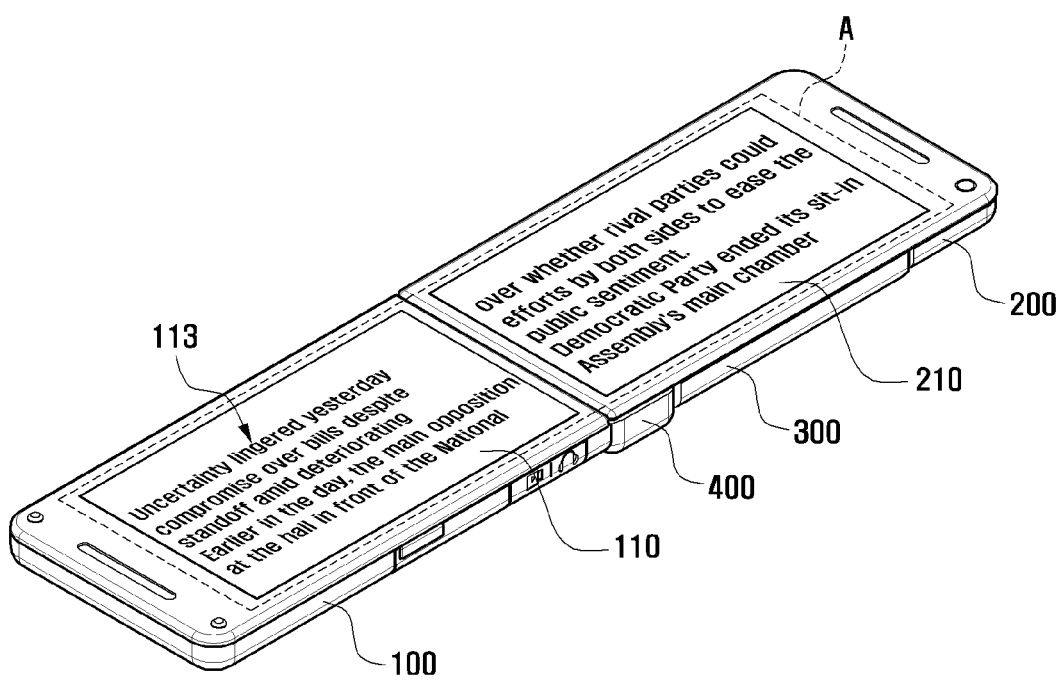

FIG. 5A, FIG. 5B and FIG. 5C are exemplary views illustrating a sliding unit 300 of the mobile terminal rotates by '180°,' and FIG. 6A and FIG. 6B illustrate examples of screen output of the first display unit 110 and the second display unit 210 according to a use state in the mobile terminal of FIGS. 1A and 1B.

FIG. 5A sequentially illustrates a state when the sliding unit 300 rotates by '180°,' FIG. 5C illustrates a state when the sliding unit 300 rotates by about '145°,' FIG. 5B illustrates a state when the sliding unit 300 rotates by '180°.'

When the sliding unit 300 starts to rotate by '90°,' the sliding unit 300 can rotate about the first hinge portion 410, and as shown in FIG. 5C, one end 211 of the second display unit 210 can rotate together with the sliding unit 300 in a contact state with one end 111 of the first display unit 110. As described above, when a user wants to perform a general use such as communication and character message transmission, the sliding unit 300 can be positioned by rotating by about '145°.' In this example, as shown in FIG. 6A, a display controller (not shown) can control the first display unit 110 to output a touch keypad 112 including numerals, characters, and special symbols and can control the second display unit 210 to output various information 212 such as a menu, image, and moving picture.

Referring to FIG. 5B, in a state where the sliding unit 300 rotates by '180°,' one end 211 of the second display unit 210 can contact with one end 111 of the first display unit 110, and a surface of the first display unit 110 and a surface of the second display unit 210 become in a same plane. As shown in FIG. 6B, because it is necessary for a user to use a wide screen in order to perform Internet web browsing, when using a wide display unit A, the sliding unit 300 can be positioned by rotating by '180°.' In this example, the display controller can control to extend an output screen 113 such as Internet web page to a full screen of the wide display unit A by connecting the first display unit 110 and the second display unit 210.

When the sliding unit 300 rotates in an opposite direction from a rotated state by '180°,' the second display unit 210 can be positioned parallel to a lower surface 401 of the hinge coupler 400, as shown in FIG. 5B, and because one end 211 of the second display unit 210 is in a contact state with one end 111 of the first display unit 110, the sliding unit 300 cannot rotate about the first hinge portion 410 and can first rotate about the first hinge portion 410. In this example, as shown in FIG. 5C, one end 211 of the second display unit 210 can rotate together with the sliding unit 300 in a contact state with one end 111 of the first display unit 110. If the sliding unit 300 further rotates in an opposite direction in a state of '90° ' shown in FIG. 4C, the sliding unit 300 can rotate based on the first hinge portion 410. In this example, one end 211 of the second display unit 210 can receive interference from the hinge coupler 400, whereby the folder unit 200 can perform a sliding movement in an insertion direction (first direction) D1 into the inside of the sliding unit 300 and thus is finally in a state of FIG. 4B.

As described above, in the mobile terminal 1 according to the exemplary embodiments, as the folder unit 200 can perform a sliding movement, the second display unit 210 of the folder unit 200 can be positioned adjacent to the first display unit 110 of the main body 100, and thus the wide display unit A can be provided and a size of a display area can be easily adjusted according to user settings. Further, as the folder unit 200 can perform a sliding movement according to a rotation of the sliding unit 300, the second display unit 210 can be positioned to adjacent to the first display unit 110, a structure of the mobile terminal 1 can be simplified, and the mobile terminal 1 can entirely formed in a small size, thereby satisfying portability of the mobile terminal 1 while providing a wide display unit for supporting an Internet web browsing function.

As described above, by enabling a folder unit to perform a sliding movement, as a second display unit of a folder unit can be positioned adjacent to a first display unit of a main body, a wide display unit can be provided such that a size of a display area can be easily adjusted according to user settings.

Further, as a folder unit can perform a sliding movement according to a rotation of a sliding unit, the second display unit can be positioned adjacent to the first display unit such that a structure of the mobile terminal can be simplified, and an entire size of the mobile terminal can be minimized.

Further, mobility of the mobile terminal while providing a wide display unit for supporting an Internet web browsing function can be satisfied.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising:
 a main body comprising a first display unit;
 a folder unit comprising a second display unit disposed opposite to the first display unit in a closed configuration of the mobile terminal;
 a sliding unit connected to a portion of the folder unit and configured to guide slide movement of the folder unit; and
 a hinge coupler configured to connect the sliding unit and the main body, the sliding unit being configured to rotate about at least one axis of rotation associated with the hinge coupler,
 wherein the second display unit is configured to perform slide movement toward the main body along the sliding unit so as to be disposed adjacent to the first display unit by rotation of the sliding unit about the at least one axis of rotation associated with the hinge coupler, and
 wherein a wide display is formed based on a surface of the first display unit and a surface of the second display unit being disposed in a single plane.

2. The mobile terminal of claim 1, wherein the hinge coupler comprises:
 a first hinge portion rotatably connected to a portion of the main body; and
 a second hinge portion rotatably connected to a portion of the sliding unit.

3. The mobile terminal of claim 2, wherein the folder unit is configured to perform one or more slide movements when the sliding unit is rotated about an axis of rotation associated with the second hinge portion.

4. The mobile terminal of claim 2, wherein the hinge coupler comprises:
 a first folder hinge connected to the first hinge portion, the first folder hinge being configured to provide a resisting power when the sliding unit is rotated about a first axis of rotation associated with the first hinge portion, and
 a second folder hinge connected to the second hinge portion, the second folder hinge being configured to provide a resisting power when the sliding unit is rotated about a second axis of rotation associated with the second hinge portion.

5. The mobile terminal of claim 4, wherein the resisting power provided by the first folder hinge is greater than the resisting power provided by the second folder hinge.

6. The mobile terminal of claim 1, wherein the sliding unit comprises:
 a body having a space configured to selectively house at least a portion of the folder unit;
 a guide unit disposed at either one side or both sides of the body and configured to guide the slide movement of the folder unit; and
 an elastic member configured to connect the folder unit and the body, and to provide an elastic force to the folder unit when the folder unit performs one or more slide movements.

7. The mobile terminal of claim 6, wherein the sliding unit further comprises:
 at least one stop portion configured to limit the slide movement of the folder unit and configured to enable the second display unit to be selectively positioned in at least one desired position.

8. The mobile terminal of claim 1, further comprising:
 a controller configured to control screen output of the first display unit and the second display unit according to a position of the second display unit,
 wherein the position of the second display unit is determined based on a rotation of the sliding unit.

9. The mobile terminal of claim 8, wherein the controller is further configured to control output of the first display unit and the second display unit according to a function being executed in association with the mobile terminal.

10. The mobile terminal of claim 9, wherein the function is a phone call function, a network surfing function, or a media playback function.

11. The mobile terminal of claim 6, wherein the elastic member is further configured to bias an end portion of the first display unit against an end portion of the second display unit when the surface of the first display unit and the surface of the second display unit are disposed in the single plane.

12. The mobile terminal of claim 1, wherein the sliding unit is further configured to rotate about at least one more axis of rotation associated with the hinge coupler, and wherein rotation about a second one of the at least two axes of rotation is retarded until rotation about a first one of the at least two axes of rotation is complete.

\* \* \* \* \*